United States Patent [19]
Anglin

[11] Patent Number: 5,173,597
[45] Date of Patent: Dec. 22, 1992

[54] CARD READER WITH TAPERED CARD SLOT GUIDE SURFACE

[75] Inventor: Noah L. Anglin, San Jose, Calif.
[73] Assignee: Verifone, Inc., Redwood City, Calif.
[21] Appl. No.: 618,042
[22] Filed: Nov. 23, 1990
[51] Int. Cl.[5] .................... G06K 13/06; G06K 13/24; G06K 13/00
[52] U.S. Cl. ................................. 235/483; 235/482
[58] Field of Search ............... 235/483, 475, 481, 482, 235/484, 445, 435

[56] References Cited

U.S. PATENT DOCUMENTS

| | | | |
|---|---|---|---|
| 3,763,352 | 10/1973 | Del Rio et al. | 235/61.11 |
| 4,236,667 | 12/1980 | Crowley et al. | 235/482 X |
| 4,322,614 | 3/1982 | Sloan et al. | 235/475 |
| 4,587,571 | 5/1986 | Anderson et al. | 235/483 |
| 4,605,843 | 8/1986 | Aubrey | 235/475 |
| 4,672,661 | 6/1987 | Clark, Jr. et al. | 235/482 |
| 4,798,942 | 1/1989 | Aubrey | 235/483 |
| 4,954,698 | 9/1990 | Yasunaga | 235/482 X |
| 5,065,001 | 11/1991 | Hennick et al. | 235/435 |

*Primary Examiner*—John W. Shepperd
*Assistant Examiner*—Christopher R. Glembocki
*Attorney, Agent, or Firm*—Lowell C. Bergstedt

[57] ABSTRACT

A data terminal having a reader assembly for reading a data carrier having at least one data track formed thereon and having a predetermined track width. The terminal housing has a card guide slot with a read head mounted next to the slot. The bottom wall section of the card guide slot has an upper surface characterized by a downwardly tapering portion extending from an apex point substantially underneath the data pickup transducer such that a data carrier being swiped through the guide slot is more likely to maintain contact between the bottom of the card and the apex point and thus have sufficiently accurate registration between the pickup transducer and the data stripe for accurate detection of data recorded thereon.

6 Claims, 3 Drawing Sheets

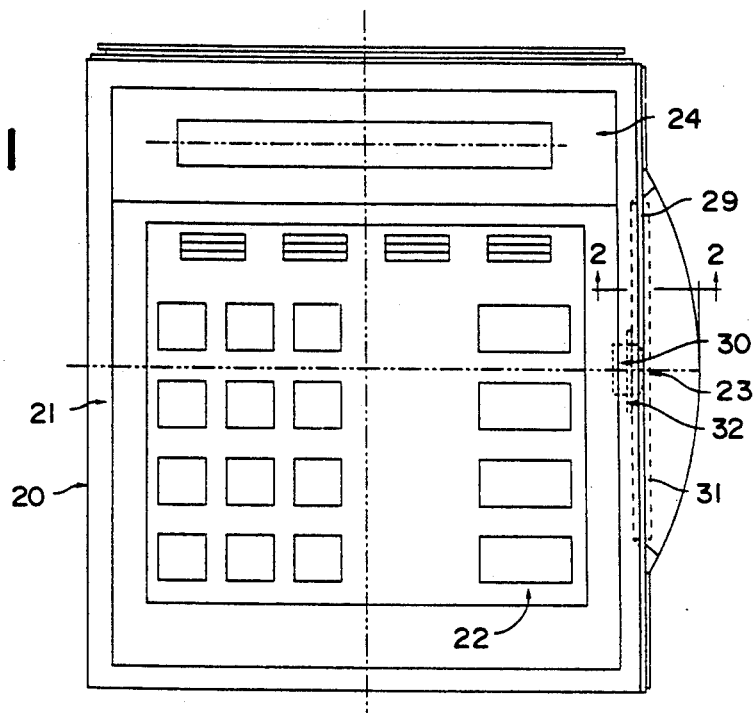
FIG. 1
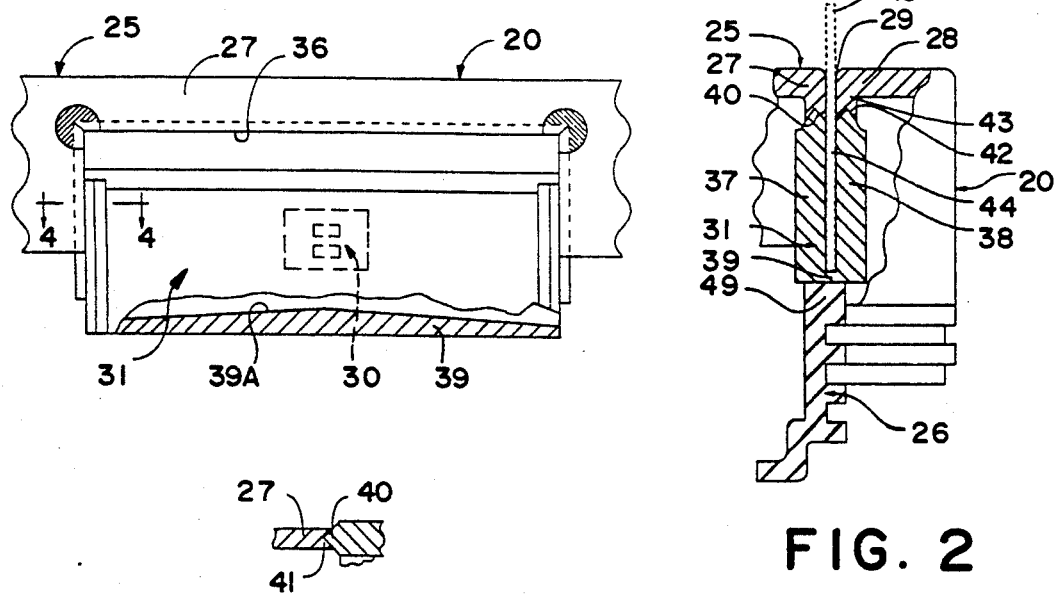
FIG. 3
FIG. 4
FIG. 2

CARD READER WITH TAPERED CARD SLOT GUIDE SURFACE

FIELD OF THE INVENTION

This invention related generally to apparatus for reading data tracks on data cards. More specifically, this invention relates to apparatus for reading magnetic data tracks on a magnetic stripe data card.

BACKGROUND AND PRIOR ART

In the prior art, the bottom surface of a card guide or card slot typically has a flat configuration and the data pickup element of the transducer mounted adjacent to the card guide is positioned at a fixed distance from this bottom surface. Accurate reading of a data stripe on a data card passed though the card slot is dependent on maintaining the bottom edge of the card in contact with the bottom card guide surface. If the card is swiped through the card guide at an angle, with just a corner in contact with bottom guide surface during a portion of the complete path of the card through the reading location, data reading errors are typically produced if the angle of the card edge relative to the bottom guide surface is sufficient to displace a substantial portion of the data track above the position of the data pickup element for that data track. Such data reading errors force the operator to swipe the card through the reader a second time.

This problem with read errors due to angled card swiping is especially exacerbated in card readers with short card slot length on the order of the length of the data card itself or less as is the case, for example, with use of a card reader in a hand held, battery powered unit, of a shirt pocket size. Depending on how the card is being gripped by the operator of the terminal and the swiping motion used, the card may start out with the bottom edge in full contact with the bottom edge of the card guide, but then start to pivot about one of the corners of the card as the card is being swiped. In some cases the entire swipe may occur with only one corner of the card in contact with the bottom guide surface.

OBJECTS OF THE INVENTION

It is the principal object of this invention to provide an improved card reader assembly.

It is another object of this invention to provide a card reader assembly that provides a reduction in data reading errors on a card swiped through a card slot.

FEATURES AND ADVANTAGES OF THIS INVENTION

This invention features a data terminal having a card reader assembly for reading a data card having at least one data track formed thereon and having a predetermined track width. The card reader includes a read head having a data pickup element on a front face thereof. A housing assembly defines a card guide slot adapted to guide a data card during a manual swipe of said card through said card reader assembly. The card guide slot comprises first and second opposite side wall sections and a bottom wall section with one of said side wall sections defining an access window for said read head relative to said card guide slot. A read head positioning arrangement mounts the read head in a preselected position relative to said bottom wall section of said card guide. This bottom wall section of the card guide slot has an upper surface characterized by a downward tapering from a point directly underneath said data pickup element such that a data card being swiped through said guide slot is more likely to have accurate registration between said pickup element and said data stripe for accurate detection of data recorded thereon.

Other objects, features and advantages of this invention will be apparent from a consideration of the detailed description of various embodiments set forth below in conjunction with the accompanying drawings.

BRIEF DESCRIPTION OF THE DRAWINGS

FIG. 1 is a top plan view of a point of sale terminal incorporating card reader apparatus in accordance with this invention.

FIG. 2 is a partial section view of card reader apparatus in accordance with this invention and taken along the lines 2—2 in FIG. 1.

FIG. 3 is a partial fragmented section view showing a tapered card slot bottom surface in accordance with this invention.

FIG. 4 is a partial section view taken along the lines 4—4 in FIG. 3.

DETAILED DESCRIPTION OF INVENTION EMBODIMENTS

Figure 8:
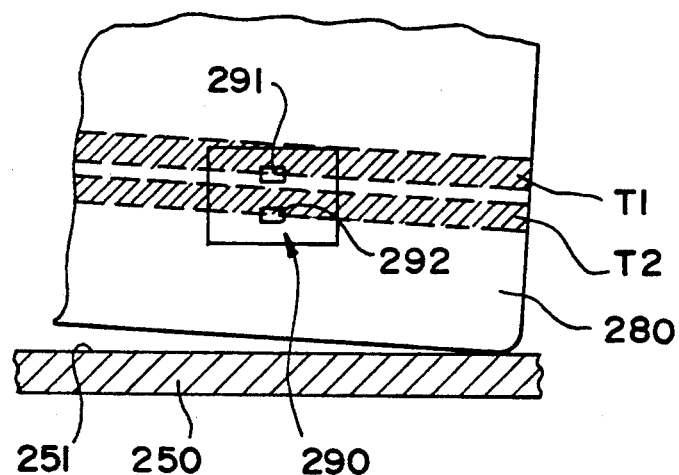
FIGS. 8 and 9 illustrate the principles of operation of a card reader assembly in accordance with this invention.
Figure 9:
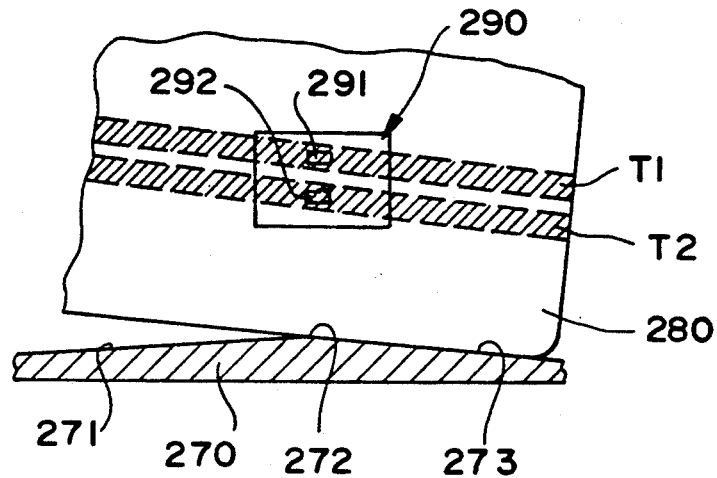

Referring now to FIGS. 1-5, the elements of this invention are shown as comprising an apparatus 20 having a reader subassembly 23 for reading a data carrier 48 (FIG. 2). Apparatus 20 in this embodiment is in the form of a point of sale transaction automation terminal. Data carrier 48 as shown here is a plastic card, e.g. a credit card or a debit card or other form of data card, which carries a magnetic stripe having one or more data tracks thereon. FIGS. 8 and 9 illustrate such a card having two data track locations thereon. It should be understood that this invention is adaptable to use with various forms of data carriers in addition to data cards with magnetic stripes thereon, such as, for example, a data carrier with a bar code thereon or a data carrier, such as a check, with MICR bank account and identification data thereon.

Apparatus 20 includes a housing 21 which defines a guide slot location 29 for data carrier 48. A transducer in the form of magnetic read head 30 is provided for reading data stored on a data stripe on data carrier 48. A data carrier guide, for example, removable card guide 23, is provided in housing 21 at data carrier slot location 29. Card guide 23 has a bottom wall portion 39 and a major side wall portion 37 and defines an access window (50 in FIG. 5). A mounting arrangement 32 is provided for mounting magnetic read head 30 at a prearranged location within access window 50 for accurate detection of data on the data stripe of data carrier 48 when it is manually swiped through guide slot 29. It should be understood that this invention is equally applicable to use of a removable card guide and a card guide that is integrally formed by the housing of the terminal or other card guide structure.

Point of sale terminal 20, which incorporates features of this invention, includes a housing assembly 21, a keyboard assembly 22, a card reader assembly 23, and a display assembly 24. Housing assembly 21 comprises a top enclosure section 25 and a bottom enclosure section 26 which snap together to form a complete enclosure for electronic circuit subassemblies (not shown) that are mounted therewithin. Card guide 31 is mounted in a rectangular opening 36 formed in side wall portion 27 of top enclosure section 25. As shown in FIGS. 3 and 4, each of the edge sections 41 that define rectangular opening 36 have a groove formed therein that cooperates with a tongue formed on edge portions 40 of side wall 37 of card guide 31. Thus side wall 37 as adapted to be removably mounted in opening 36 by sliding it in from the bottom of the opening.

As shown in FIG. 2, side wall portion 28 of bottom enclosure section 26 and side wall portion 27 of top enclosure section 25 define card guide location 29. The active card guide slot 44 at the card reading location associated with read head 30 is, however, defined by side wall sections 37 and 38 and bottom wall section 39 of card guide 31. The upper edge of side wall section 38 has an outwardly extending tongue 42 formed thereon and this tongue cooperates with an associated groove 43 formed in side wall portion 28 to provide a stable, registered mounting relationship therebetween.

As shown in FIG. 3, bottom wall section 39 has an upper surface 39A which serves as a guide surface for the bottom edge of a data card. Upper surface 39A has the characteristic that it tapers downwardly from a point underneath transducer element 30 to the edges of guide slot 44 or to some point short of the edge on a long card slot. This tapered guide surface provides more accurate registration of data stripes with data pickup elements on a front face of transducer element 30, especially when guide slot 44 is relatively short in relation to the length of the data carrier passing through it. A more complete explanation of the operational advantage of this tapered surface is given below in conjunction with FIGS. 8 and 9.

Figure 5:
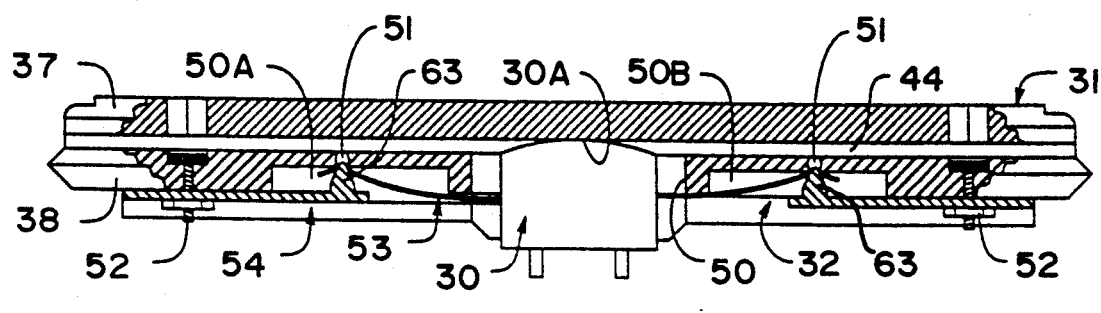
FIGS. 5 and 6 illustrate the structure of a card reader subassembly serving as one application environment for this invention.
Figure 6:
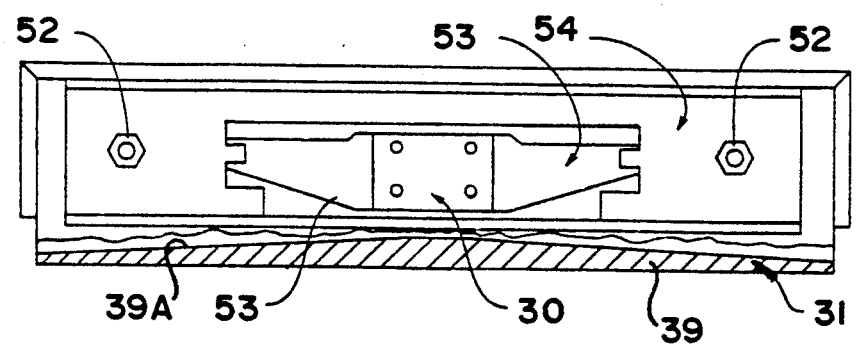

FIGS. 5 and 6, taken together with FIGS. 2-4, illustrate in greater detail card guide element 31 and a preferred form of a mounting arrangement for a read head 30 in the form of a magnetic stripe read head. In this embodiment, mounting arrangement 32 comprises leaf spring 53 and clamp 54. A pair of mounting apertures in leaf spring 53 cooperate with a pair of projections 63 on clamp 54 and a pair of apertures 51 in side wall member 38 of card guide 31 to mount leaf spring 53 in an accurate location on side wall 38. When so mounted, a forward portion of read head 30 extends through access aperture 50 in side wall member 38.

Projections 63 on clamp or bracket 54 cooperate with apertures in leaf spring 53 to introduce an initial biasing spring force into the leaf spring by deforming the end portions into depressed regions 50A and 50B in side wall member 38. This biasing spring force urges the front surface 30A of transducer 30 toward the opposite wall surface of card slot 44 and sets the spring pressure which maintains the read head in contract with the magnetic stripe on a data card passing through the card slot 44.

One of the mounting apertures in leaf spring 53 is slotted to provide an adjustable mounting relationship with the projection 63 of clamp 54 extending therethrough to take up changes in effective leaf spring length as the clamp is initially assembled to the card guide element and as the position of the read head 30 changes when a card is passed through the card slot. This leaf spring and clamp mounting arrangement permits the read head 30 to rotate slightly to adjust the read head contact with a warped data card.

As shown, a threaded stud and nut mounting arrangement 52 cooperates with the mounting apertures 62 in clamp 54 to mount the clamp to the card guide element 31. Access apertures are provided through side wall member 37 to permit a press fit stud to be seated in a recess formed in side wall member 38 with the threaded stud extending through side wall member 38 to receive the clamp and the nut for fastening these two pieces together in the manner depicted.

Figure 7:
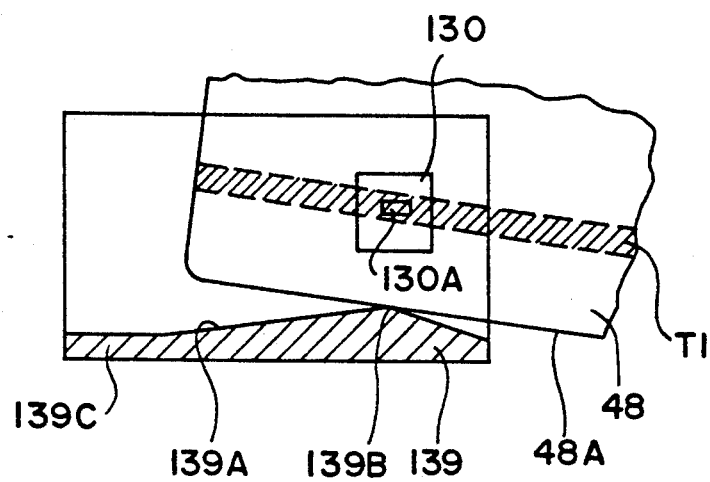
FIG. 7 is a schematic section view illustrating a card reader assembly with a short card slot length and incorporating the features of this invention.

FIG. 6 has a cut away section to show tapering card guide surface 39A formed by bottom wall section 39. FIG. 7 illustrates the application of this invention in a card reader embodiment with a short card slot, e.g. a slot that may be on the order of one-half the length of the data card passing through it and with the read head 130 positioned near one end of the card slot. In this case, the angle of the downwardly tapering wall section 139 may be in the range of one to three degrees and is preferably at least about two degrees. The degree of taper shown in the drawings is exaggerated for purposes of illustration.

With this degree of taper, data card 48 may be passed through the slot at a slight angle and data track T1 thereon will still be aligned closely enough with data pick up element 130A to provide accurate reading of the data on the track. In addition, the card may actually swivel slightly about the apex of the tapered bottom surface during the swiping of the card without having a gross affect on the accuracy of data detection as long as the bottom edge 48A of card 48 is in contact with the apex point or region 139B. This apex point or region 139B is preferably slightly rounded to provide a smooth guide surface for the data card.

FIG. 7 also illustrates that bottom wall section 139 defining a card guide slot may have a bottom wall portion 139C which has a flat, untapered upper surface so that the downwardly tapering portion of guide surface 139A extends over only a portion of the overall length of the card guide.

Referring now to FIGS. 8 and 9, the advantages of a tapered bottom guide surface in accordance with this invention will be discussed in more detail. The apex 272 of tapered bottom guide surface 271 in FIG. 9 is located substantially at the reading position of the data carrier which is generally the mounting position of a read head, such as magnetic stripe read head 290. Other types of reading transducers, such as read heads for bar codes and the like, may also be utilized.

Especially in a card reader terminal having a short card slot, i.e. on the order of the length of a data card itself or less, there is a sometimes a problem with a flat card guide surface when a card swiped at an angle through the card slot. As shown in FIG. 8, with reference to a card slot with a straight bottom wall configuration throughout the reading region, a slightly tilted card with one corner region in contact with the bottom guide surface 251 may position one or more of the data tracks T1, T2 out of alignment with the magnetic pick up elements 291 and 292 during a substantial portion of the scan of the data track. This is likely to cause an erroneous data read and force the operator to reswipe the card with greater care as to card angle and flatness in the slot.

By providing a downwardly tapered card slot bottom wall, as shown in FIG. 7 and 9 and having the apex right below the read/write gap of the head at the correct height, this tends to keep the card and the read head in the right proximal relationship to achieve a good read. This arrangement tends to compensate for a person grasping the data card incorrectly and tends to produce a good read as long as the bottom of the card is in contact with the apex. The angle of the ramped slot is actually small, i.e. in the range of one to three degrees and preferably at least about two degrees. The angles shown in the drawings are exaggerated for illustration of the existence of the taper. These small degrees of taper tend to prevent the lever arm effect which tends to occur when the card has been gripped incorrectly and thus the card is swiped with only one corner in contact with the card slot bottom. The lever arm effect multiplies the error at the read/write gap of the read head.

The features of this invention have been described above in connection with several alternative embodiments. These are provided by way of example of the general principles of this invention and it should be understood that numerous other variations and different embodiments could be employed.

For example, while the invention has been described particularly in connection with incorporating it within a point of sale terminal, it should be understood that the invention may be applicable to a number of forms of apparatus that need a manual card reader capability. For example, the invention could be employed in a standalone card reader module which is adapted to be coupled to a point of sale terminal. In such an embodiment, the card guide element would still be mounted to a housing but overall the housing would be smaller and not enclose as many electronic modules and subassemblies.

The invention may be employed in terminals or hand held units which utilize the removable card guide concept and it is equally applicable to use in terminals that utilize other structure to define the card guide slot.

It should thus be apparent that numerous alternations and adaptations of the invention are possible and the above described embodiments should be considered to be examples and not limitations. Persons of skill in this art could make numerous other modifications without departing from the scope of the invention as set forth in the following claims.

What is claimed is:

1. In a data terminal having a reader assembly for reading a data carrier having at least one data track formed thereon and having a predetermined track width, a read head having a data pickup transducer on a front face thereof, said transducer having a pickup area with a width generally comparable to said predetermined track width;

a housing assembly including a guide slot formed therein and adapted to receive a lower portion of said data carrier to guide said data carrier during a manual swipe of said data carrier through said reader assembly, said guide slot having card entry and exit points and comprising first and second opposing and substantially straight side wall sections and a bottom wall section, one of said straight side wall sections having an access window therein for admitting said data pickup transducer on said read head into said guide slot; and read head positioning means for mounting said read head with said data pickup transducer thereon located in said access window in a preselected position relative to said bottom wall section of said guide slot and intermediate said card entry and exit points, said bottom wall section of said guide slot having an upper wall surface serving to guide one edge of said data carrier and characterized by a downwardly tapering portion extending from an apex point substantially underneath said data pickup transducer toward one end of said guide slot thereby improving the accuracy of registration between said data pickup transducer and said data stripe for accurate detection of data recorded on said data stripe as said data carrier is being swiped through said guide slot.

2. Apparatus as claimed in claim 1, wherein said housing assembly comprises an injection molded plastic case having a pair of partial wall sections defining a guide slot position for a plastic data card serving as said data carrier, and a card guide means removably mounted to said injection molded plastic case at said card guide slot position and formed from a plastic material having high wear resistance characteristics; said card guide means having at least one major sidewall section and a bottom wall section, said one major sidewall section having said access window formed therein, and said bottom wall section having said upper surface with said downwardly tapering portion therein.

3. Apparatus as claimed in claim 2, wherein said read head positioning means comprising mounting means for mounting said read head on said major sidewall section of said card guide means with said data pickup transducer thereon located in said access window in an accurately registered position relative to said apex point of said downwardly tapered portion.

4. Apparatus as claimed in claim 1 wherein the angle of said downward tapering is in the range of one to three degrees.

5. In a card reader assembly for reading a data stripe on a data card being manually swiped through said card reader assembly, guide slot means defining a guide slot for said data card and including straight side wall portions on opposite sides of said guide slot, card entry and exit points, and a bottom surface portion extending between said straight side wall portions, said bottom surface portion serving as a guide surface for one edge of a data card being manually swiped through said guide slot;

transducer means for detecting data on said data stripe; and mounting means for mounting said transducer means in a prearranged mounting position relative to said guide slot means and said bottom surface and intermediate said card entry and exit points, said bottom surface portion of said guide slot being formed with a downward taper extending from an apex point located substantially at the mounting position of said transducer means towards each of the opposite ends of said guide slot.

6. Apparatus as claimed in claim 5 wherein the angle of said downward taper is in the range of one to three degrees.

* * * * *